Feb. 24, 1970  H. H. HOEHN ETAL  3,497,451
PERMEATION SEPARATION WITH TYPE-8 NYLON MEMBRANES
Filed Oct. 11, 1967  2 Sheets-Sheet 1

INVENTORS
HARVEY H. HOEHN
DONALD G. PYE

BY James H. Ryan

ATTORNEY

INVENTORS
HARVEY H. HOEHN
DONALD G. PYE

BY James H. Ryan

ATTORNEY

United States Patent Office 3,497,451
Patented Feb. 24, 1970

3,497,451
PERMEATION SEPARATION WITH TYPE-8
NYLON MEMBRANES
Harvey H. Hoehn and Donald G. Pye, Wilmington, Del.,
assignors to E. I. du Pont de Nemours and Company,
Wilmington, Del., a corporation of Delaware
Filed Oct. 11, 1967, Ser. No. 674,569
Int. Cl. B01d 13/00, 39/16
U.S. Cl. 210—23
14 Claims

ABSTRACT OF THE DISCLOSURE

Process for separating the components of fluid mixtures, particularly the desalination of sea water, by the use of membranes formed from type-8 nylon.

FIELD OF THE INVENTION

This invention is concerned with, and has as its principal object provision of, a new process for the permeation separation of fluid mixtures and solutions by forcing the same by the use of pressure through a membrane formed from type-8 nylon.

DESCRIPTION OF THE PRIOR ART

Permeation separation procedures have been extensively examined for separating the components of fluid mixtures and solutions by osmosis and by ultrafiltration i.e., reverse or pressure osmosis. Desalination of sea water and brackish water is a representative field in which such separations have been studied. Other fields include detoxication of industrial wastes and the treatment of sewage.

Ultrafiltration processes have appeared particularly attractive. In such processes a pressure differential is established between the two faces of a membrane so that the pressure on the fluid mixture or solution to be separated, as compared to the separated fluid phase, exceeds the normal static osmotic pressure of such fluid against the membrane being employed. In this manner, the fluid component which can pass through the membrane is forced out of the charging fluid and is obtained in undiluted form.

The key factor in such a separation is the permeation membrane itself. It must be formed from a material having some chemical stability since stability affects both membrane life and fluid-separation properties. It must have a characteristic selectivity for performing a useful separation by passing some components of the fluid to be treated and holding back others. Furthermore, it must have mechanical strength to withstand pressure under conditions of the separation, and it must have a sufficient throughput rate to accomplish its characteristic separation in a practical length of time.

Evident desirable characteristics in the membrane employed are affected both by the material from which the membrane is made and by the physical configuration thereof. Membranes developed heretofore have generally possessed one of two physical configurations. Probably the better known of these is simply a porous film permeable to water but less permeable to included impurities under the conditions, chiefly of pressure, employed. Such a film membrane is shown, for example, in the Loeb and Sourirajan U.S. Patent 3,133,132, where a cellulosic ester is used as the film-forming material. In operation, saline or other impure water is merely forced through the film, the impurity passing through less readily than the water.

A second type of membrane consists of a bundle of hollow fibers formed from a water-permeable material. One or both of the ends of the bundle, which may contain millions of individual fibers, are "potted" or embedded in some plastic or other retaining material and the whole encased in a housing with liquid inlet and outlet means. Saline water is forced into the housing under pressure and purified water is drawn out through the ends of the hollow fibers. The Mahon U.S. Patents 3,228,876 and 3,228,877 disclose such hollow-fiber membranes and their use, cellulose triacetate being the material from which the bundles are made in each instance. Hollow-fiber bundles serving as the basis for such membranes may themselves be prepared as disclosed in the Breen and Pamm U.S. Patent 2,999,296 or British Patent 843,179.

THE DRAWINGS

The present invention concerns the use of a particular class of materials as permeation membranes with accomplish highly useful separations in either of the physical configurations noted above, are physically strong, and are characterized by exceptionally advantageous throughput rates when compared to known permeation membranes. Both the use of the membranes and the membranes themselves will be understood in more detail from the remainder of the specification and from the drawings in which the same numeral represents identical parts and wherein.

Figure 1:
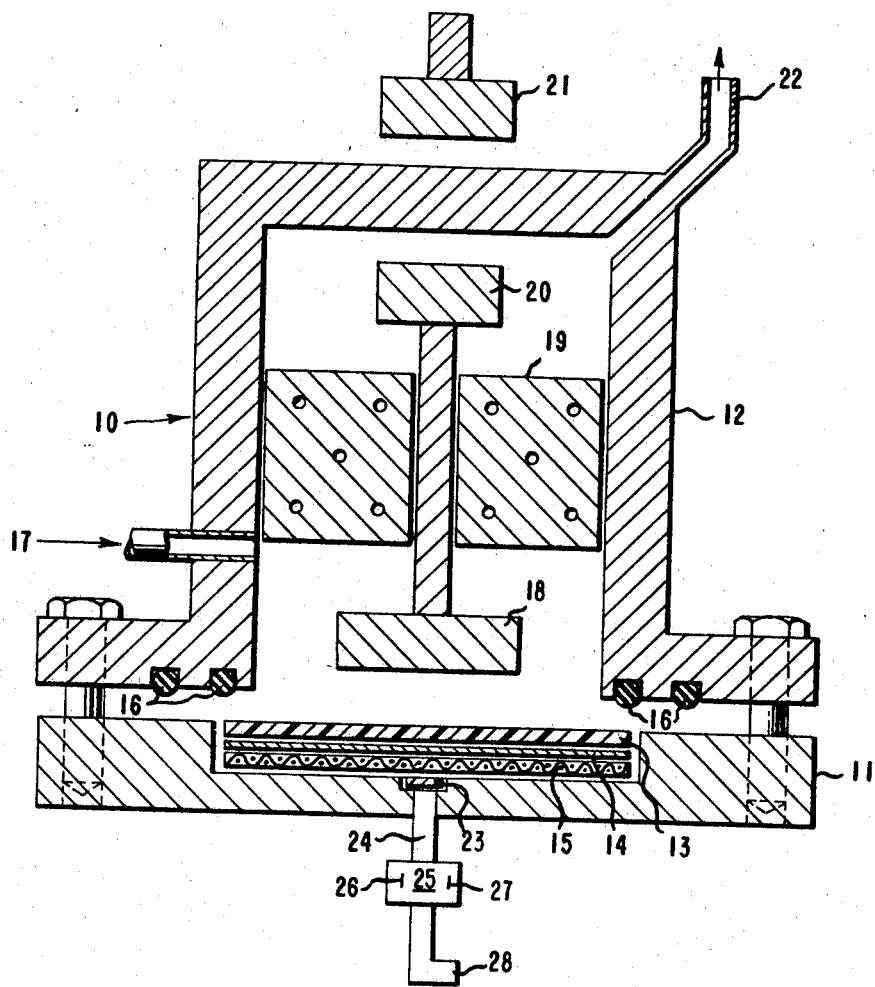
FIG. 1 is a section of a permeation cell showing one, i.e., the film, form of the membrane of the present invention.

Referring to FIG. 1, the base section 11 and upper section 12 of the permeation cell 10 are machined from blocks of rustproof metal. Film 13, the semipermeable membrane, is a disk mounted on a layer of filter paper 14 against a stainless steel wire screen 15. When upper part 12 of the cell is bolted to lower part 11, synthetic elastomer O-rings 16 seat firmly around the periphery of the membrane and against the metal. The inlet 17 for feed fluid into the cell is adjacent to the membrane, and the fluid is agitated by a magnetically driven stirrer blade 18 positioned by support 19 and controlled by internal and external magnets 20 and 21 to ensure the contact of fresh fluid with the membrane surface at all times. Removal or recirculation of the feed fluid is provided through the feed exit 22. Fluid passing through membrane 13 is collected through a metal frit 23 into a small conductivity cell 25 where electrical connections 26 and 27 permit determination of salt content to be made by a conductivity bridge (not shown). From conductivity cell 25 the fluid passes into a pipe 28 and its volume and flow rate are observed.

Figure 2:
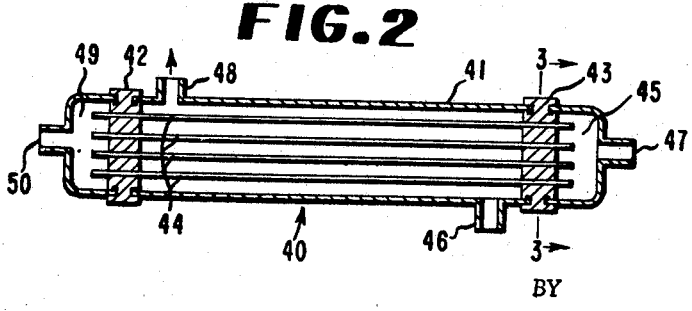
FIG. 2 is a section of another type of permeation cell having a preferred form, i.e., the hollow-fiber form, of a membrane of the invention.
Figure 3:
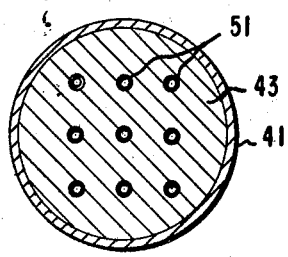
FIG. 3 is a section along line 3—3 of FIG. 2.

FIG. 2 shows an alternative form of permeation cell 40 in which casing 41 carries, potted in plugs 42 and 43, a bundle 44 of hollow nylon fibers serving as the preferred membrane of the invention, one end of the bundle 44 extending through plug 43 into collecting chamber 45 and the other through plug 42 into chamber 49. Fluid, fed into cell 40 through feed 46 and dialyzed through the walls of the fibers and passed through the hollow interior thereof into collection chambers 45 and 49, is withdrawn through exits 47 and 50. Excess fluid not dialyzed is withdrawn through casing exit 48. FIG. 3 shows a section through plug 43 mounted in casing 41 and showing the hollow ends of individual fibers 51 (not in scale) extending through the plug. It will be understood that millions of fibers actually may be in bundle 44.

Figure 4:
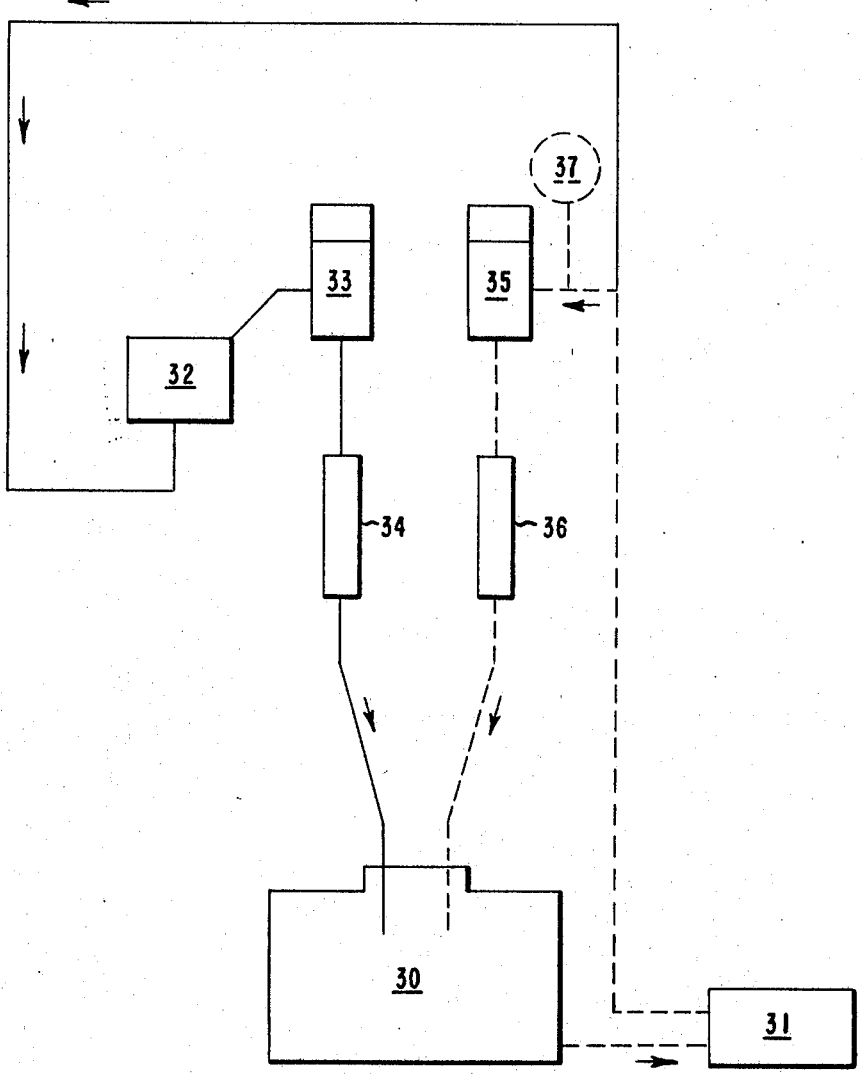
FIG. 4 is a largely self-explanatory diagram of a pumping and control system usable with a permeation cell of FIG. 1 and FIG. 2.

FIG. 4 shows a pumping system providing circulation of feed fluid and maintenance of pressure inside a permeation separation cell. Fluid is circulated from a reservoir 30 by pump 31 through the cell represented by a block 32 (which may be either of the forms shown by FIG. 1 and FIG. 2), the pressure regulator 33, the flow meter 34 and back to reservoir 30. Temperature is controlled as desired by placing the cell and permeate measuring equipment in an air bath (not shown) monitored by a thermocouple (also not shown) mounted adjacent to the test film inside the cell. Alternatively, the cell may be placed in a water bath. Regulator 35 and flow meter 36 permit excess fluid from the pump to by-pass the permeation cell and to be returned to the reservoir, the by-pass portion of the system being indicated by broken lines. Pressure is monitored by gauge 37. Conventional piping is, of course, supplied connecting the units of the control system as indicated.

DETAILS OF THE INVENTION

In accordance with the present invention, there is now provided a process of treating fluid mixtures and solutions by reverse osmosis or ultrafiltration using a semipermeable membrane which is a substantially linear polyamide having an inherent viscosity of at least 0.4 and containing as an integral part of the main polymer chain recurring groups of the formula:

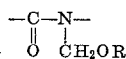

which are separated by an average number of carbon atoms of at least two and wherein R represents the organic radical obtained by removal of OH from (a) compounds of the formula:

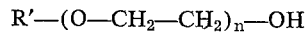

where R' is hydrogen or a lower alkyl group and $n$ is 1–100 (or more preferably, 1–4), (b) lower alkyl glycolates, or (c) glycerine, said groups consisting at least 10% of the amide groups in the main polymer chain.

The modified polyamides of which the permeator membranes of this invention are made are described in coassigned U.S. Patent 2,430,860 (Cairns). The polyamides from which these modified material are prepared are of the general type described in U.S. Patents 2,071,250, 2,071,253, and 2,130,948. Such polyamides having an inherent viscosity of at least 0.4 as defined in U.S. 2,130,948 and having hydrogen-bearing amide groups as an integral part of the polymer chain are treated at a temperature from 0 to 150° C. with formaldehyde and a formaldehyde-reactive compound of formula ROH as defined above in the presence of an oxygen-containing acid catalyst having an ionization constant of at least $9.6 \times 10^{-6}$ and an equivalent conductance, measured at 25° C. in 0.001 N concentration, no greater than 370 ohms$^{-1}$ cm.$^2$.

Formaldehyde may be used in monomeric form or prepared by depolymerization of one of its condensed forms such as paraformaldehyde, α-polyoxymethylene, trioxane, and the like.

Operable alcohols are those compounds of formula ROH, noted above, in which H is a reactive hydrogen as determined by the Zerewitinoff test.

Acid catalysts as defined above include formic, trimethylacetic, trichloroacetic, oxalic, chloroacetic, benzoic, maleic, p-toluenesulfonic, and phosphoric acids and substituted phosphoric acids such as $(CH_3)H_2PO_4$ and $(C_4H_9)H_2PO_4$.

Semipermeable membranes for use in the present invention may be prepared by dissolving a modified polyamide as described above in a suitable solvent such as an aqueous alcohol and casting the solution to form a film or spinning the solution through an annular orifice to obtain a hollow fiber. Alternatively, a film or hollow fiber of a polyamide is treated with formaldehyde and a formaldehyde-reactive compound ROH in the presence of an acid catalyst as defined above to obtain a modified polymer film or hollow fibers suitable for use as a semipermeable membrane. Such membranes are characterized by exceptionally improved throughout and selectively when compared to membranes of an unmodified polyamide or of an N-methoxymethyl-modified polyamide.

All polyamides (nylons) employed in the examples which follow had inherent viscosities in excess of 0.4 and when modified had —CH$_2$OR groups as shown above on 10% or more of the amide groups in the main polymer chain.

EMBODIMENTS OF THE INVENTION

There follow some nonlimiting examples which illustrate the invention in more detail. Examples 1–11 show the use of a semipermeable membrane of the film type as illustrated in FIG. 1. Examples 12 and 13 show the use of the preferred membrane, i.e., one of the fiber-bundle type, as particularly illustrated in FIG. 2 and FIG. 3. In all of these examples, a control system essentially that of FIG. 4 was used. Temperatures were ambient atmospheric. Parts and percentages are given in terms of weight.

With specific regard to Examples 1–11:

66 nylon film 66 nylon film in thicknesses of 0.5, 1, and 2 mils was prepared from 66 nylon flake (Zytel® 43, Du Pont Company) by extruding at temperatures in the range of 288–296° C. through a slit die onto a polished quench roll, controlled at 66–77° C., at a rate of 100–150 linear feet/minute with an air gap between the die and the quench roll of 4–7″.

Permeation flow measurements

The permeation flow rate W through the film membrane was calculated from the test data by the formula:

$$W = \frac{Q \times t \times 10^6}{A \times \Delta P}$$

where:

Q is the permeate flow in gallons per day;
T is the thickness of the permeation membrane in mils;
A is the area of the permeation membrane in square feet; and
ΔP is the pressure of the feed solution in p.s.i.g. minus the difference in the osmotic pressures of the feed solution and the permeate in p.s.i.g.

Feed solutions

The examples below refer to tests with two types of saline solutions. One of the saline solutions used was a 3.5% NaCl solution (35,000 p.p.m. NaCl), a concentration of salt about equal to the mineral content of sea water. With this solution, the permeation data were not complicated by unknown factors regarding the effect of the various ions present in sea water or synthetic sea water. The salt content of the permeate, being a pure NaCl species, was easily monitored by conductivity measurements. Tests with 3.5% NaCl solution were run at 30° C. and 1500 p.s.i.g. unless otherwise indicated.

A brackish sulfate mixture containing 700 p.p.m. of calcium sulfate (0.07%), 400 p.p.m. of magnesium sulfate (0.04%), and 400 p.p.m. of sodium sulfate (0.04%), making a total solids content of 1500 p.p.m. of mixed sulfate (0.15%), was also used for desalination tests. This mixture was formulated to simulate many midcontinent ground waters. Tests with the mixed sulfate solution were run at 30° C. and 500 p.s.i.g. unless otherwise indicated.

Salt passage

Salt passage (SP) is defined as the percentage of the salt in the feed solution passing through the membrane with the permeate. It is determined from the conductivity of the permeate and the salt content in the feed solution.

In the permeator of FIG. 1, a 1-mil unmodified 66 nylon film that had been prepared by extrusion showed a flow rate (W) of 3.6 and a salt passage of 7% (2500 p.p.m.) for 3.5 NaCl feed at 1500 p.s.i.g. With the mixed sulfate feed at 500 p.s.i.g., unmodified 66 nylon showed a W of 6 and a salt passage of 13% (196 p.p.m.).

EXAMPLE 1

Part A

Flake polymer of 66 nylon of the type used for textile fiber spinning as described in U.S. Patent 2,163,636 (105 g.) was dissolved in 420 g. of a mixture prepared from 900 ml. of 90% formic acid and 675 ml. of acetic anhydride. To the solution were added 129 g. of paraformaldehyde and 798 g. of methyl glycolate. The reaction mixture was stirred and heated at 65° C. for 30 minutes. The product was then poured into water with vigorous agitation. The precipitated polymer was washed with water and dried to obtain 56 g. of N-methoxycarbonylmethoxymethyl nylon in the form of a white fluff.

Part B

A sample of N-methoxycarbonylmethoxymethyl-modified nylon prepared by the procedure of Part A was molded between platens at 180° C. under 140,000 lbs. pressure for 2 minutes and remolded at 150° C. under 160,000 lbs. pressure for 2 minutes to obtain a film about 3 mils thick. A specimen from this film was tested in the permeator of FIG. 1 and showed a W of 113 at a salt passage of 17% with 3.5% sodium chloride feed.

EXAMPLE 2

Part A

Flake 66 nylon of the type used for spinning textile fibers, inherent viscosity 1.92 (105 g.), was dissolved in 905 g. of a mixture of formic acid and acetic acid prepared by reacting 480 g. of acetic anhydride with 718 g. of 90% formic acid. To this solution were added 129 g. of paraformaldehyde and 798 g. of the monomethyl ether of diethylene glycol. The reaction mixture was stirred and heated at 65° C. for 30 minutes. The product was poured into water with vigorous agitation. The precipitated polymer was washed with water and dried to obtain 106 g. of N-methoxyethoxyethoxymethyl nylon which on analysis showed 9.5% combined formaldehyde and 8.2% combined —OR ether function.

Part B

A 15% solution of the polymer from Part A in ethanol/water 85/15 was cast into a film. Two layers of this film were pressed together between platens at 200° C. under 18,000 lbs. pressure for 10 minutes to yield a film about 3 mils thick. This was tested in the permeator of FIG. 1 and showed a W of 81 at 25% salt passage with 3.5% sodium chloride feed.

EXAMPLE 3

Part A

Nylon 66 flake (180 g., inherent viscosity 1.12, of the type used for spinning textile fiber) was dissolved in 655 g. of 90% formic acid by heating the solution at 60° C. with stirring. To the solution was added 180 g. of paraformaldehyde dissolved in 1230 g. of methoxytriglycol. The reaction mixture was then stirred at 60–66° C. for 30 minutes. The N-methoxyethoxyethoxyethoxymethyl modified nylon thus prepared was isolated by pouring the reaction mixture into water while agitating vigorously. After several washings, the polymer was dried under vacuum. The dried polymer weighed 113 g. and contained 7.2% formaldehyde and 5% of —OR ether function.

Part B

A solution of the modified nylon of Part A was prepared by stirring 50 g. of the polymer into 450 g. of aqueous 85% ethanol. The solution obtained was filtered and cast into a film of about 2 mil thickness. Test specimens cut from the solution-cast film showed a W of 490 at 43% salt passage for 3.5% sodium chloride feed and W of 790 at 2% salt passage for the 0.15% mixed sulfate feed.

EXAMPLE 4

Part A

Nylon 66 flake (180 g., inherent viscosity 1.12) was dissolved in 655 g. of 90% formic acid by heating and stirring at 60° C. To the solution was added 180 g. of paraformaldehyde dissolved in 570 g. of the monomethyl ether of ethylene glycol. The reaction mixture was stirred at 60–65° C. for 12 minutes. The product was poured into water with vigorous agitation. The precipitate was washed with fresh water and dried to obtain 167.5 g. of N-β-methoxyethoxymethyl nylon which analyzed for 9.2% formaldehyde and 6.3% —OR ether function.

Part B

A 10% solution of the polymer of Part A in 85/15 ethanol/water was prepared and cast to yield a polymer film about 2 mils thick. Test specimens cut from the solution-cast film were tested in the permeator of FIG. 1 and showed a W of 240 at 30% salt passage for 3.5% sodium chloride feed and W of 338 at 2.6% salt passage for 0.15% mixed sulfate feed.

EXAMPLE 5

Part A

A mixture of 798 g. of the monomethyl ether of diethylene glycol, 516 g. of paraformaldehyde, and 2 ml. of 50% sodium hydroxide was stirred at 90° C. until the paraformaldehyde dissolved. To this solution 258 g. of oxalic acid dihydrate was added. The resulting bath was brought to 65° C. and a 2 mil film of 66 nylon was immersed in it for 20 minutes. The resulting film or N-methoxyethoxyethoxymethyl nylon was washed in water and air-dried.

Part B

A test specimen of the film from Part A showed a W of 23 at a salt passage of 19% for for 3.5% sodium chloride feed.

EXAMPLE 6

Part A

A mixture of 798 g. of methyl glycolate, 516 g. of paraformaldehyde, and 2 ml. of 50% sodium hydroxide was stirred at 90° C. until the paraformaldehyde dissolved. To this solution 258 g. of oxalic acid dihydrate was added. The resulting bath was then brought to 65° C. and a 6″ x 6″ piece of 2 mil film of 66 nylon was immersed in it for 4 minutes. The resulting film of N-methoxycarbonylmethoxymethyl nylon was washed in water and dried. The weight gain from the modifying process was 11.2%.

Part B

A test specimen of the film from Part A showed a W of 75 at a salt passage of 15% for 3.5% sodium chloride feed.

EXAMPLE 7

Part A

A mixture of 800 g. of glycerine, 500 g. of paraformaldehyde, and 2 ml. of 50% sodium hydroxide was stirred at 90° C. until the paraformaldehyde dissolved. To this solution 250 g. of oxalic acid dihydrate and 50 g. of water were added. The resulting bath was brought to 80° C. and a 6″ x 6″ piece of 1 mil film of 66 nylon was immersed in it for 40 minutes. The resulting film of N-modified nylon was washed in water and dried. The weight gain was 8%.

Part B

Test specimens of the film from Part A showed a W of 22 at a salt passage of 19% for 3.5% sodium chloride feed and a W of 99 at a salt passage of 3.8% for 0.15% mixed sulfate feed.

EXAMPLE 8

Part A

A mixture of 800 g. of diethylene glycol, 500 g. of paraformaldehyde, 50 g. of water, and 2 ml. of 50% sodium hydroxide was heated at 90° C. until the paraformaldehyde dissolved. The resulting bath was brought to 70° C. and a 6" x 6" piece of 1 mil film of 66 nylon was immersed in it for 20 minutes. Oxalic acid dihydrate (250 g.) was then added to the bath and the film retained therein for an additional 40 minutes. The resulting film of N-β-hydroxyethoxyethoxymethyl nylon was washed with water and dried. The weight gain was 16%.

Part B

Test specimens cut from the film of Part A showed a W of 22 at a salt passage of 19% for 3.5% sodium chloride feed and a W of 145 at a salt passage of 0.8% for 0.15% mixed sulfate feed.

EXAMPLE 9

Part A

A mixture of 800 g. of triethylene glycol, 500 g. of paraformaldehyde, and 2 ml. of 50% sodium hydroxide was heated at 90° C. until the paraformaldehyde dissolved. To this solution 250 g. of oxalic acid dihydrate was added and the resulting bath was held at 80° C. for 24 hours. The bath was maintained at 80° C. and a 6" x 6" piece of 1 mil 66 nylon film was immersed in it for 30 minutes. The resulting film of N-β-hydroxyethoxyethoxyethoxymethyl nylon was washed in water and dried. The weight gain was 14%.

Part B

Test specimens of the film from Part A showed a W of 87 at a salt passage of 29% with 3.5% sodium chloride feed and a W of 142 at a salt passage of 1.7% with 0.15% mixed sulfate feed.

EXAMPLE 10

Part A

Ethylene glycol (800 g.) and paraformaldehyde (800 g.) were stirred at 90° C. in the presence of a small amount of sodium hydroxide until the paraformaldehyde dissolved. To this solution was added 500 g. of glacial acetic acid. The resulting solution was stirred at 90° C. for 24 hours. A 6" x 6" piece of 66 nylon film 1 mil thick prepared by melt extrusion was placed in the bath and allowed to soak at 90° C. for 2 hours. The N-β-hydroxyethoxymethyl modified nylon film was then removed and placed in distilled water and allowed to stand for several hours. This film was dried in the hood overnight.

Part B

A test specimen cut from the film showed a W of 860 and a salt passage of 8.8% for the 0.15% mixed sulfate feed.

EXAMPLE 11

Part A

A bath was prepared by dissolving 600 g. of paraformaldehyde (20 moles) in 1942 g. tetraethylene glycol (10 moles) by heating the mixture at 90° C. in the presence of 2 cc. of 50% sodium hydroxide solution. To the formaldehyde solution was added 600 g. of glacial acetic acid (10 moles) and 126 g. of oxalic acid dihydrate (1 mole). The solution was stirred at 90° C. for 2 days. A piece of 2-mil 6-nylon film (commercial; Capran® 77–C, Allied Chemical Corporation) was placed in the bath and allowed to soak at 90° C. for 1 hour. The N-β-hydroxyethoxyethoxyethoxyethoxymethyl modified nylon film was then removed from the bath and placed in distilled water for 2 hours after which it was dried overnight. The film showed an increase in weight of 12% over the weight before treatment.

Part B

Test specimens cut from this piece of film showed a permeation rate of W=246 at the salt passage of 38% for 3.5% NaCl feed and a W of 564 at 2.3% salt passage for the mixed sulfate feed.

With specific regard to Examples 12 and 13:

6 nylon hollow fibers 6 nylon hollow fibers were prepared from commercially available nylon 6 (Type 401, Spencer Chemical Company). The spinning equipment consisted of a screw melter and a 5-hole sheath core spinneret. Each hole in the spinneret had a plate hole diameter of 44 mils, and a center hole of 36 mils diameter, a slot width of 4 mils, and a center hole (for gas inlet) of 17 mils diameter. The melter barrel was operated at 272° C. and the spinneret block at 246° C. Sand pack pressure was 1350 p.s.i. at a feed rate of 0.93 g./minute/hole. The fibers were air-quenched without drawing and wound up at a rate of about 465 yards/minute.

Potting procedure

Resin for potting the ends of hollow fiber bundles was prepared by mixing 100 g. of an epoxy polymer modified with butyl glycidyl ether ("ERL 2795," Smooth-On Manufacturing Company), 16 g. of a modified aliphatic amine adduct (Sonite® 15, Smooth-On Manufacturing Company), and 20 g. of triphenyl phosphite (Mod-E-Pox®, Monsanto). The fiber ends were inserted in the resin in a suitable mold immediately after mixing and the resin was allowed to set up by storing at room temperature for 16–24 hours.

EXAMPLE 12

Part A

A bundle of 4020 hollow fibers spun from 6 nylon resin (outside diameter 54μ, inside diameter 24μ) was soaked in a bath of tetraethylene glycol/formaldehyde/acetic acid/oxalic acid, mole ratio 10/20/10/1, at 90° C. for 2 hours. The bundle was then placed in water for 2 hours to remove unreacted material and hung in a ventilated hood to dry. The bundle gained 14.5% in weight.

Part B

The treated bundle was fabricated into a permeator of the type shown in FIG. 2 for testing. In a test with 0.15% mixed sulfate saline water similar to that of Example 3 at 200 p.s.i. permeation value of 0.023 gal./ft.$^2$/day was obtained with a salt passage of 11%, the flow being from the outside to the inside of the hollow fibers (shell side feed).

Part C

A control run of a bundle of unmodified 6 nylon hollow fibers in a permeator otherwise identical to the one in Part B, using 0.15% mixed sulfate feed at 200 p.s.i. had a permeation value substantially below 0.002 gal./ft.$^2$/day which was too small for accurate measurement.

EXAMPLE 13

Part A

A solution for modification of nylon hollow fibers was prepared in the following way: Ttetraethylene glycol (2428 g.), paraformaldehyde (750 g.), and 50% sodium hydroxide solution (2 cc.) were heated together at 90° C. for 1 hour. To this solution was added glacial acetic acid (750 g.) and oxalic acid dihydrate (158 g.). The mixture was heated at 90° C. for 2 days. A permeator potted in copper hardware with a 6 nylon hollow fiber element similar to the one used in Example 12 was placed in a liquid bath to control temperature. The temperature was raised to 90° C. The modification solution prepared as described above was circulated through the permeator and returned to the pot by means of a small centrifugal pump. After contacting the fibers in the permeator with solution at 90° C. for an hour, the permeator was disconnected and the inlet and outlet were capped.

Part B

This permeator was placed on permeation test using a 0.15% mixed sulfate saline feed at 30° C. with shell side feed. Operating at 200 p.s.i.g., feed pressure, the permeation rate was 0.064 gal./ft.$^2$/day at 28% salt passage. After operating this way for a day, the feed pressure was increased to 400 p.s.i. Under these conditions, the flow was 0.093 gal./ft.$^2$/day and salt passage was 20%.

Other formaldehyde-reactive compounds of formula ROH as defined above which may be used in place of those shown in the foregoing examples to prepare the correesponding modified polyamids include the monoethyl ether of ethylene glycol, the monoisopropyl ether of ethylene glycol, the monohexyl ether of ethylene glycol, the monobutyl ether of diethylene glycol, the monobutyl ether of triethylene glycol, polyethylene glycols of molecular weight from 300 to 6000, monomethyl ethers of polyethylene glycols with molecular weights in the range from 500 to 750, ethyl glycolate, isobutyl glycolate, hexyl glycolate, and the like.

The foregoing detailed description has been given for clarity of understanding only and no unnecessary limitations are to be understood therefrom. The invention is not limited to the exact details shown and described for obvious modifications will be apparent to those skilled in the art.

What is claimed is:

1. A permeation separation process comprising passing, by means of pressure applied thereto,
a fluid having a plural number of components, including ionic constituents,
through
a semipermeable membrane formed from a substantially linear polyamide having an inherent viscosity of at least 0.4 and containing as an integral part of the main polymer chain recurring groups of the formula:

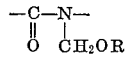

which are separated by an average number of carbon atoms of at least two and wherein R represents the organic radical obtained by removal of OH from
(a) compounds of the formula:
R'—(O—CH$_2$—CH$_2$)$_n$—OH where R' is hydrogen or a lower alkyl group and $n$ is 1–100 (or more preferably, 1–4),
(b) lower alkyl glycolates, or
(c) glycerine,
said groups constituting at least 10% of the amide groups in the main polymer chain.

2. The process of claim 1 wherein the fluid is saline water.

3. The process of claim 1 wherein the semipermeable membrane is in the form of a film.

4. The process of claim 1 wherein the semipermeable membrane is in the form of hollow fibers formed from said substantially linear polyamide.

5. A semipermeable membrane adapted for use in the process of claim 1 comprising at least one bundle of hollow fibers formed from a substantially linear polyamide having an inherent viscosity of at least 0.4 and containing as an integral part of the main polymer chain recurring groups of the formula

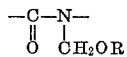

which are separated by an average number of carbon atoms of at least two and wherein R represents the organic radical obtained by removal of OH from
(a) compounds of the formula:

R'—(O—CH$_2$—CH$_2$)$_n$—OH where R' is hydrogen or a lower alkyl group and $n$ is 1–100 (or more preferably, 1–4),
(b) lower alkyl glycolates, or
(c) glycerine,
said groups constituting at least 10% of the amide groups in the main polymer chain.

6. A semipermeable membrane of claim 5 wherein R is methoxycarbonylmethoxymethyl.

7. A semipermeable membrane of claim 5 wherein R is methoxyethoxyethoxymethyl.

8. A semipermeable membrane of claim 5 wherein R is methoxyethoxyethoxyethoxymethyl.

9. A semipermeable membrane of claim 5 wherein R is β-methoxyethoxymethyl.

10. A semipermeable membrane of claim 5 wherein R is β-hydroxyethoxyethoxymethyl.

11. A semipermeable membrane of claim 5 wherein R is β-hydroxyethoxyethoxyethoxymethyl.

12. A semipermeable membrane of claim 5 wherein R is β-hydroxyethoxymethyl.

13. A semipermeable membrane of claim 5 wherein R is β-hydroxyethoxyethoxyethoxyethoxymethyl.

14. In permeation separation apparatus, a membrane according to claim 5, means for contacting an ion-containing fluid with the membrane, and means for supplying pressure to the fluid in excess of the osmotic pressure of the same.

References Cited

UNITED STATES PATENTS

| | | | |
|---|---|---|---|
| 2,783,894 | 3/1957 | Lovell et al. | 210—500 |
| 3,140,256 | 7/1964 | Martin et al. | 210—22 X |
| 3,170,867 | 2/1965 | Loeb et al. | 210—22 |
| 3,220,960 | 11/1965 | Wichterle et al. | 210—321 X |
| 3,228,877 | 1/1966 | Mahon | 210—22 |
| 3,276,996 | 10/1966 | Lazare | 210—22 |

OTHER REFERENCES

Lonsdal et al., Reverse Osmosis for Water Desalination, Office of Saline Water R&D Report No. 150, received in Patent Office Dec. 16, 1965, 84pp., pp. 75–84 relied on.

REUBEN FRIEDMAN, Primary Examiner

F. A. SPEAR, JR., Assistant Examiner

U.S. Cl. X.R.

210—321, 500